Patented Nov. 16, 1948

2,453,983

UNITED STATES PATENT OFFICE 2,453,983

PREVENTION AND DESTRUCTION OF WEEDS

Wilfred Archibald Sexton, Manchester, and Roland Edgar Slade and William Gladstone Templeman, Bracknell, England, assignors to Imperial Chemical Industries Limited, a corporation of Great Britain No Drawing. Application August 27, 1945, Serial No. 613,020. In Great Britain April 7, 1941

Section 1, Public Law 690, August 8, 1946
Patent expires April 7, 1961

12 Claims. (Cl. 167—45)

This invention relates to the prevention and destruction of weeds.

We have found that substances of the general formula which follows are effective against weeds. The general formula is Ar.X.CH$_2$.Y, in which Ar stands for a phenyl or naphthyl residue which may contain alkyl (C$_1$ to C$_6$), halogen and nitro substituents in addition to the —X.CH$_2$.Y substituent, X stands for O, S or NH and Y stands for a carboxy group in which the hydrogen atom may be replaced by a water-soluble salt-forming atom or group.

The substances are generally effective in quantities of a few pounds per acre and so in order to be able to distribute them effectively, they are incorporated in larger quantities of fertilisers, and/or solid soil conditioning agents and/or inert diluents, the resulting preparations being preferably in dry pulverulent form.

Although exerting a phytocidal action on weeds, the preparations can be applied to ground containing germinating or growing weeds and cereal or other useful crops so as to kill or stunt the weeds effectively without harming the useful crops. The preparations are, however, in general most conveniently applied to the soil before, during or immediately after germination of the weed.

The substances can be used very effectively for the control of charlock in oat crops. When applied to the soil before germination, the growth of charlock can be prevented without harming the oats.

It is already known to spray dilute sulphuric acid on charlock. Sulphuric acid, however, is not only highly corrosive, but it neutralises and renders inactive a corresponding amount of lime or other alkali in the soil.

When applying the substances with fertilisers or soil-conditioning agents, the substances are conveniently mixed in such proportions that the soil receives the correct dressing both of weed killing substance and fertiliser, soil conditioning agent and/or diluent. Inorganic and organic fertilisers and manures may be used, for example ammonium sulphate, basic slag, potash salts, and superphosphates, peat, and hop manures. Hydrated lime, ground lime, and chalk are convenient soil-conditioning agents. Sand, talc, and clay in powder form may be used as solid inert diluents. By an inert diluent we mean a solid substance which is neither a fertiliser nor a soil-conditioning agent, and which is without harmful effect on crops.

Our invention accordingly consists in the use, for the prevention and destruction of weeds, of a compound conforming to the general formula Ar.X.CH$_2$.Y, in which Ar is selected from the group consisting of the phenyl radical, the napthyl radical and such radicals containing also at least one substituent selected from halogen atoms, nitro-groups, and alkyl groups containing not more than 6 carbon atoms. X is selected from the group consisting of oxygen, sulphur, and —NH— radical, and Y is selected from the group consisting of the carboxyl radical and carboxy radicals in which the hydrogen atom is replaced by a water-soluble salt-forming substituent. The invention also includes the use of such a compound for destroying weeds associated with growing cereal crops. The invention further consists of compositions comprising such a compound in effective amounts together with a solid carrier therefor which may be a fertiliser, a solid conditioning agent, or a solid inert diluent.

Advantageously the compounds used for the prevention or destruction of weeds, or as components of compositions suitable for such purposes, are those conforming to the formula Ar.O.CH$_2$.Y, in which Ar is either an unsubstituted naphthyl radical or a phenyl radical containing at least one substituent selected from the group consisting of chlorine and the methyl radical, and Y has the above specified significance.

Thus the invention includes within its scope the use of phenoxyacetic acid, o-, m-, p-methylphenoxyacetic acid, o-, m-, p-ethylphenoxyacetic acid, o-, m-, p-chlorophenoxyacetic acid, o-, m-, p-nitro-phenoxyacetic acid, the methylchlorophenoxyacetic acids, the dimethylphenoxyacetic acids, alpha- and beta-naphthoxyacetic acid, the chloronaphthoxyacetic acids, and the nitronaphthoxyacetic acids; water-soluble salts of the acids, in particular water-soluble alkali metal salts of such acids, are also included. All of the above are examples of compounds in which X in the above formula is oxygen, but it will be understood that the invention also includes analogous compounds in which X, instead of being oxygen, is sulphur, or is an —NH— group.

The following examples illustrate but do not limit the invention, all parts being by weight.

Example 1

100 parts of chalk were intimately mixed with 20 parts of sodium beta-naphthoxyacetate. The resulting mixture when applied to soil containing oat seeds and weeds at the rate of 1 cwt. per acre prevented establishment of weeds without harming the cereal crop.

Example 2

25 parts of sodium beta-naphthoxyacetate were intimately mixed with 100 parts of ammonium sulphate. The resulting mixture when applied to the soil after oats had been sown, and prior to germination, at 100 lbs. per acre prevented establishment of weeds, while encouraging the growth of the oats.

Example 3

25 parts of sodium beta-naphthoxyacetate were intimately mixed with 1000 parts of hop manure to give a composition suitable for the control of weeds.

Example 4

10 parts of the sodium salt of p-toloxyacetic acid were intimately mixed with 100 parts of talc. The resulting powder was evenly distributed at the rate of 1 cwt. per acre on a field sown with oats. The germination of the oats was unimpaired but development of charlock was prevented.

In place of the sodium salt of p-toloxyacetic acid there may be used soluble salts of the following acids: p-chlorophenoxyacetic acid, 2,4,6-trichlorophenoxyacetic acid, 3- and 5-chloro-2-methylphenoxyacetic acid, o-toloxyacetic acid and 2,4- and 2,5-dimethylphenoxyacetic acids, p-butylphenoxyacetic acid, alpha-naphthoxyacetic acid, alpha-naphthylaminoacetic acid and alpha-naphthylmercaptoacetic acid.

We claim:

1. The method of selectively destroying or preventing the growth of weeds in a useful crop which comprises applying to the area a compound conforming to the general formula $Ar.X.CH_2.Y$, in which Ar is selected from the group consisting of the phenyl radical, the naphthyl radical and such radicals containing also at least one substituent selected from halogen atoms, nitro groups, and alkyl radicals containing not more than 6 carbon atoms, X is selected from the group consisting of oxygen, sulphur and —NH— radical, and Y is selected from the group consisting of the carboxy radical and carboxy radicals in which the hydrogen atom is replaced by a water-soluble salt-forming substituent, the compound being applied in an amount sufficient to kill the weeds but without substantial injury to the useful crop.

2. The method of selectively destroying or preventing the growth of weeds in a useful crop which comprises applying to the area a compound selected from the group consisting of the naphthoxyacetic acids and water-soluble salts thereof, the compound being applied in an amount sufficient to kill the weeds but without substantial injury to the useful crop.

3. A method for the prevention and destruction of weeds which comprises applying to a locus to be protected a compound conforming to the general formula $Ar.X.CH_2.Y$, in which Ar is selected from the group consisting of the phenyl radical, the naphthyl radical and such radicals containing also at least one substituent selected from halogen atoms, nitro groups, and alkyl radicals containing not more than 6 carbon atoms, X is selected from the group consisting of oxygen, sulphur, and —NH— radical, and Y is selected from the group consisting of the carboxy radical and carboxy radicals in which the hydrogen atom is replaced by a water-soluble salt-forming substituent, the compound being applied in amount sufficient to exert an herbicidal action.

4. A dry pulverulent composition for selectively killing weeds comprising a divided, inert solid and a compound conforming to the general formula $Ar.X.CH_2.Y$, in which Ar is selected from the group consisting of the phenyl radical, the naphthyl radical and such radicals containing also at least one substituent selected from halogen atoms, nitro groups, and alkyl radicals containing not more than 6 carbon atoms, X is selected from the group consisting of oxygen, sulphur and —NH— radical, and Y is selected from the group consisting of the carboxy radical and carboxy radicals in which the hydrogen atom is replaced by a water-soluble salt-forming substituent, the amount of said compound being of the order of 2.5 to 25 parts per hundred parts of said solid.

5. A method for the prevention and destruction of weeds which comprises applying to a locus to be protected a compound conforming to the general formula $Ar.O.CH_2.Y$, where Ar is a phenyl radical containing at least one chlorine substituent and Y is selected from the group consisting of the carboxy radical and carboxy radicals in which the hydrogen atom is replaced by a water-soluble salt-forming substituent, the compound being applied in an amount sufficient to exert an herbicidal action.

6. A method for the prevention and destruction of weeds which comprises applying to a locus to be protected a compound conforming to the general formula $Ar.O.CH_2.Y$, where Ar is a phenyl radical containing at least one chlorine substituent and at least one methyl substituent and Y is selected from the group consisting of the carboxy radical and carboxy radicals in which the hydrogen atom is replaced by a water-soluble salt-forming substituent, the compound being applied in an amount sufficient to exert an herbicidal action.

7. A dry pulverulent composition for selectively killing weeds comprising a divided, inert solid and a compound conforming to the general formula $Ar.O.CH_2.Y$, where Ar is a phenyl radical containing at least one chlorine substituent and Y is selected from the group consisting of the carboxy radical and carboxy radicals in which the hydrogen atom is replaced by a water-soluble salt-forming substituent, the amount of said compound being of the order of 2.5 to 25 parts per hundred parts of said solid.

8. A dry pulverulent composition for selectively killing weeds comprising a divided, inert solid and a compound conforming to the general formula $Ar.O.CH_2.Y$, where Ar is a phenyl radical containing at least one chlorine substituent and at least one methyl substituent and Y is selected from the group consisting of the carboxy radical and carboxy radicals in which the hydrogen atom is replaced by a water-soluble salt-forming substituent, the amount of said compound being of the order of 2.5 to 25 parts per hundred parts of said solid.

9. The method of selectively destroying or preventing the growth of weeds in a useful crop which comprises applying to the area a compound conforming to the general formula $Ar.O.CH_2.Y$, where Ar is a phenyl radical containing at least one chlorine substituent and Y is selected from the group consisting of the carboxy radical and carboxy radicals in which the hydrogen atom is replaced by a water-soluble salt-forming substituent, the compound being applied in an amount sufficient to kill the weeds but without substantial injury to the useful crop.

10. The method of selectively destroying or preventing the growth of weeds in a useful crop which comprises applying to the area a compound conforming to the general formula Ar.O.CH$_2$.Y, where Ar is a phenyl radical containing at least one chlorine substituent and at least one methyl substituent and Y is selected from the group consisting of the carboxy radical and carboxy radicals in which the hydrogen atom is replaced by a water-soluble salt-forming substituent, the compound being applied in an amount sufficient to kill the weeds but without substantial injury to the useful crop.

11. A method for the prevention and destruction of weeds which comprises applying to a locus to be protected a compound conforming to the general formula Ar.O.CH$_2$.Y, where Ar is a phenyl radical containing one chlorine substituent and one methyl substituent and Y is selected from the group consisting of the carboxy radical and carboxy radicals in which the hydrogen atom is replaced by a water-soluble salt-forming substituent, the compound being applied in amount sufficient to exert an herbicidal action.

12. A dry pulverulent composition for selectively killing weeds comprising a divided, inert solid and a compound conforming to the general formula Ar.O.CH$_2$.Y, where Ar is a phenyl radical containing one chlorine substituent and one methyl substituent and Y is selected from the group consisting of the carboxy radical and carboxy radicals in which the hydrogen atom is replaced by a water-soluble salt-forming substituent, the amount of said compound being of the order of 2.5 to 25 parts per hundred parts of said solid.

WILFRED ARCHIBALD SEXTON.
ROLAND EDGAR SLADE.
WILLIAM GLADSTONE TEMPLEMAN.

REFERENCES CITED

The following references are of record in the file of this patent:

UNITED STATES PATENTS

| Number | Name | Date |
| --- | --- | --- |
| 2,390,941 | Jones | Dec. 11, 1945 |
| 2,396,513 | Jones | Mar. 12, 1946 |

OTHER REFERENCES

Zimmerman et al., Contrib. Boyce Thompson Inst. 12 (1941), pages 1 to 14, preprinted Mar. 18, 1941.

Zimmerman et al., Contrib. Boyce Thompson Inst. 10 (July–September 1939) pages 481 to 508.

Plant Growth Substances, by Nikol (London), 1938, pages 43 to 46.